(12) United States Patent
Bergstrom

(10) Patent No.: US 7,194,774 B2
(45) Date of Patent: Mar. 27, 2007

(54) FILTER COVER WATERFALL WITH LIGHTING FOR A PORTABLE SPA

(75) Inventor: Neil Bergstrom, La Mesa, CA (US)

(73) Assignee: Watkins Manufacturing Corporation, Vista, CA (US)

( * ) Notice: Subject to any disclaimer, the term of this patent is extended or adjusted under 35 U.S.C. 154(b) by 302 days.

(21) Appl. No.: 10/859,820

(22) Filed: Jun. 2, 2004

(65) Prior Publication Data

US 2005/0268393 A1    Dec. 8, 2005

(51) Int. Cl.
*A47K 3/00* (2006.01)
*A47K 3/10* (2006.01)

(52) U.S. Cl. .............................. 4/541.1; 4/507; 239/18; 362/96

(58) Field of Classification Search ................ 4/541.1, 4/507; 239/18; 362/96
See application file for complete search history.

(56) References Cited

U.S. PATENT DOCUMENTS

| 3,063,077 | A | | 11/1962 | Pansini |
|---|---|---|---|---|
| 3,616,918 | A | | 11/1971 | Diemond et al. |
| 3,693,800 | A | | 9/1972 | Stanfield et al. |
| 4,454,035 | A | * | 6/1984 | Stefan ........................ 210/117 |
| 4,501,659 | A | | 2/1985 | Henk |
| 4,518,495 | A | | 5/1985 | Harding |
| 4,640,784 | A | | 2/1987 | Cant |
| 4,801,378 | A | | 1/1989 | Desjoyaux et al. |
| 4,820,411 | A | | 4/1989 | Lempio |
| 4,823,837 | A | | 4/1989 | Frentzel |
| 5,089,118 | A | | 2/1992 | Mahoney |
| 5,139,660 | A | | 8/1992 | Lourie et al. |
| 5,143,605 | A | | 9/1992 | Masciarelli |
| 5,167,805 | A | | 12/1992 | Theiss |
| 5,228,999 | A | | 7/1993 | Yang |
| 5,269,913 | A | | 12/1993 | Atkins |
| 5,309,581 | A | | 5/1994 | Lockwood et al. |
| 5,336,400 | A | | 8/1994 | Patrice |
| 5,342,513 | A | | 8/1994 | Wall et al. |
| 5,510,020 | A | | 4/1996 | Gronlund |
| 5,518,611 | A | | 5/1996 | Bresolin |
| 5,584,991 | A | | 12/1996 | Wittstock et al. |
| 5,720,056 | A | | 2/1998 | Aymes |
| 6,132,056 | A | * | 10/2000 | Ruthenberg ................... 362/96 |
| 6,210,568 | B1 | * | 4/2001 | Harder ........................ 210/169 |
| 6,290,844 | B1 | * | 9/2001 | Tennyson, Jr. ............... 210/169 |
| 6,484,952 | B2 | * | 11/2002 | Koren .......................... 239/18 |
| 6,595,675 | B2 | * | 7/2003 | Dongo ........................ 362/562 |

OTHER PUBLICATIONS

Oreq Corporation product catalogue. Copyright 2001.

* cited by examiner

*Primary Examiner*—Charles E. Phillips

(57) ABSTRACT

A plenum chamber mounted to the underside of a filter cover of a portable spa provides a source of constant water flow for a waterfall. The plenum chamber is fed by a line from a water flow system of the portable spa. The plenum chamber has a shaped exit that causes a predetermined waterfall effect. A light source located at the shaped exit lights up the waterfall. Another light source is located in the filter housing to create backdrop lighting for the waterfall. The light sources are preferably fiber optic or arrays.

9 Claims, 9 Drawing Sheets

FILTER COVER WATERFALL WITH LIGHTING FOR A PORTABLE SPA

BACKGROUND OF THE INVENTION

1. Field of the Invention

The present invention relates generally to improvements in portable spas, and more particularly, pertains to a new and improved water feature for a portable spa.

2. Description of the Prior Art

In the field of portable spas, it has been the practice to utilize a variety of entertainment devices appealing to both the visual and the aural senses, besides providing the soothing, warm, bubbly, massaging waters. Thus, the prior art has devised means of providing music at the portable spa and means of changing the color of the water in the portable spa, for example. In order to appeal to the visual senses, certain prior art has provided waterfall features in the spa. However, such waterfall features tend to take up room in the portable spa that could be better used for additional seating. The present invention provides a waterfall feature without requiring the use of any space in a portable spa that could be used for seating. U.S. Pat. No. 6,210,568 is directed to a waterfall apparatus combined with a skimmer. Although its combination does not use space that could be used for seating, the waterfall feature provided is lacking in aesthetic elegance. The present invention overcomes these shortcomings.

SUMMARY OF THE INVENTION

A waterfall feature is built into the underside of a filter cover for a portable spa by providing a plenum chamber mounted to the underside of the filter cover. The plenum chamber is fed water at an inlet by a line from one of the water flow systems of the portable spa. A shaped exit to the plenum chamber provides a shaped waterfall with a constant flow. A light source located at the exit of the plenum chamber lights the waterfall in a desired color.

BRIEF DESCRIPTION OF THE DRAWINGS

The objects and many of the attendant advantages, as well as the exact nature of this invention, will be readily appreciated upon consideration of the following detailed description in conjunction with the accompanying drawings in which like reference numerals designate like parts throughout the figures thereof and wherein.

DETAILED DESCRIPTION OF THE PREFERRED EMBODIMENTS

Figure 1:
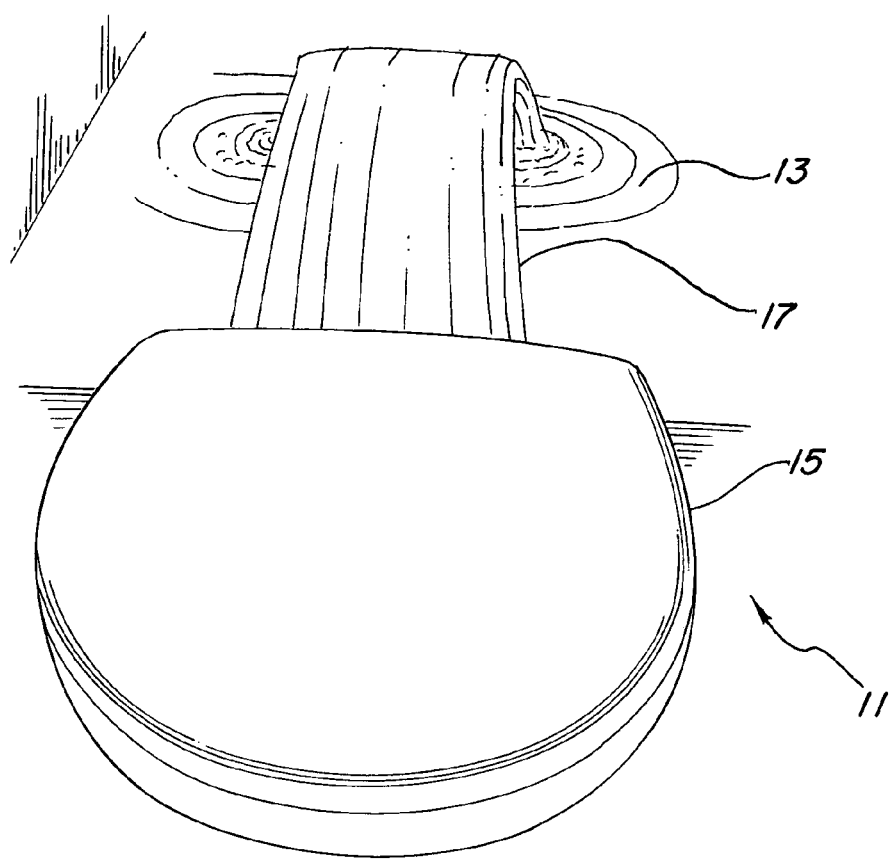
FIG. 1 is a top perspective of the waterfall apparatus of the present invention.

The filter cover waterfall apparatus 11 of the present invention is illustrated from a top perspective in FIG. 1 which shows a ribbon stream of water 17 falling from underneath a filter cover 15 into a main body of water 13 of the portable spa (not shown).

Figure 2:
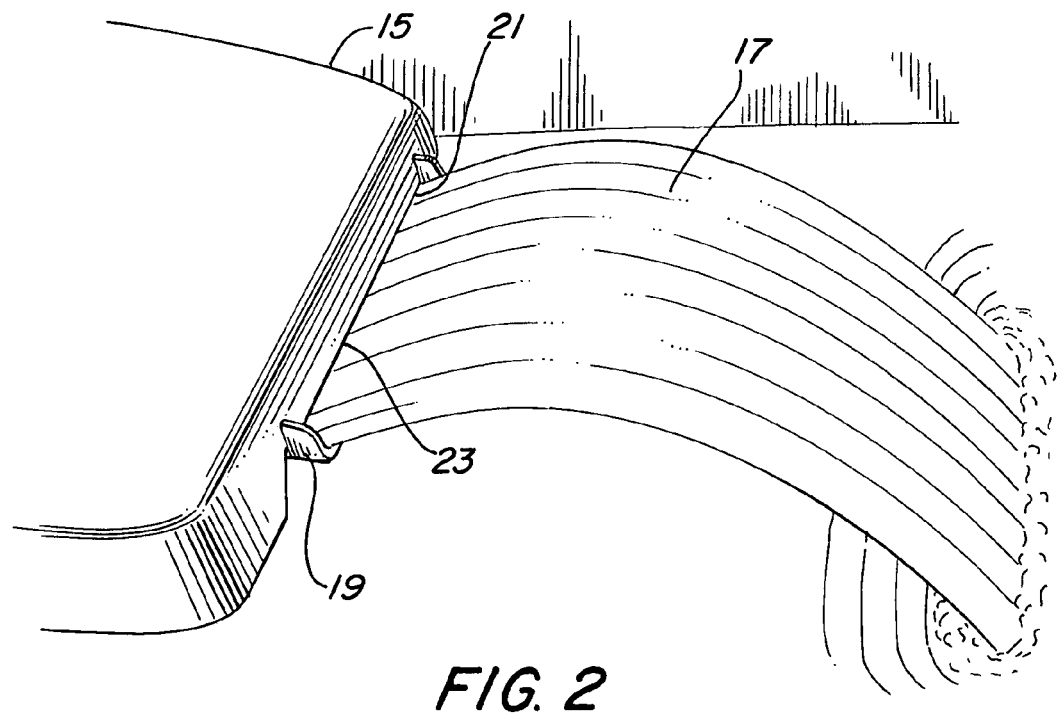
FIG. 2 is a side perspective of the waterfall apparatus of the present invention.

FIG. 2 illustrates a closer view of the ribbon waterfall flow 17 exiting from underneath the filter cover 15 through a slot 21 formed by a bottom lip 19 and the bottom edge 23 of filter cover 15.

Figure 3:
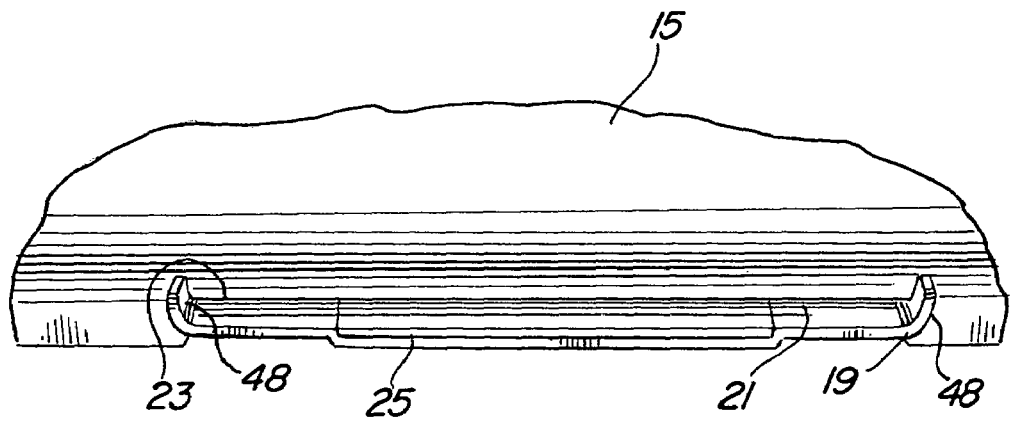
FIG. 3 is a front perspective of the water exit of the waterfall apparatus of the present invention.

Referring now to FIG. 3 for a closer look at the shaped exit slot 21 out of which the waterfall 17 flows, one can see that the lower lip 19 and the upper lip or edge 23 in the filter cover define the elongated slot out of which waterfall 17 exits. The lower lip 19 is uniquely shaped to extend slightly beyond the upper lip 23 and to have a pair of upstanding walls sections 48 along this extension. Lower lip 19 is shaped to be inclined in an upward direction, causing water that exits at upper lip 23 to flow slightly uphill until it falls over lower lip 19.

In this embodiment, lower lip 19 has a depression 25 along a major portion of its length. Depression 25, as will be more fully explained herein, receives a planar array of light conductors used to inject light into the water flowing over lower lip 19.

Figure 4:
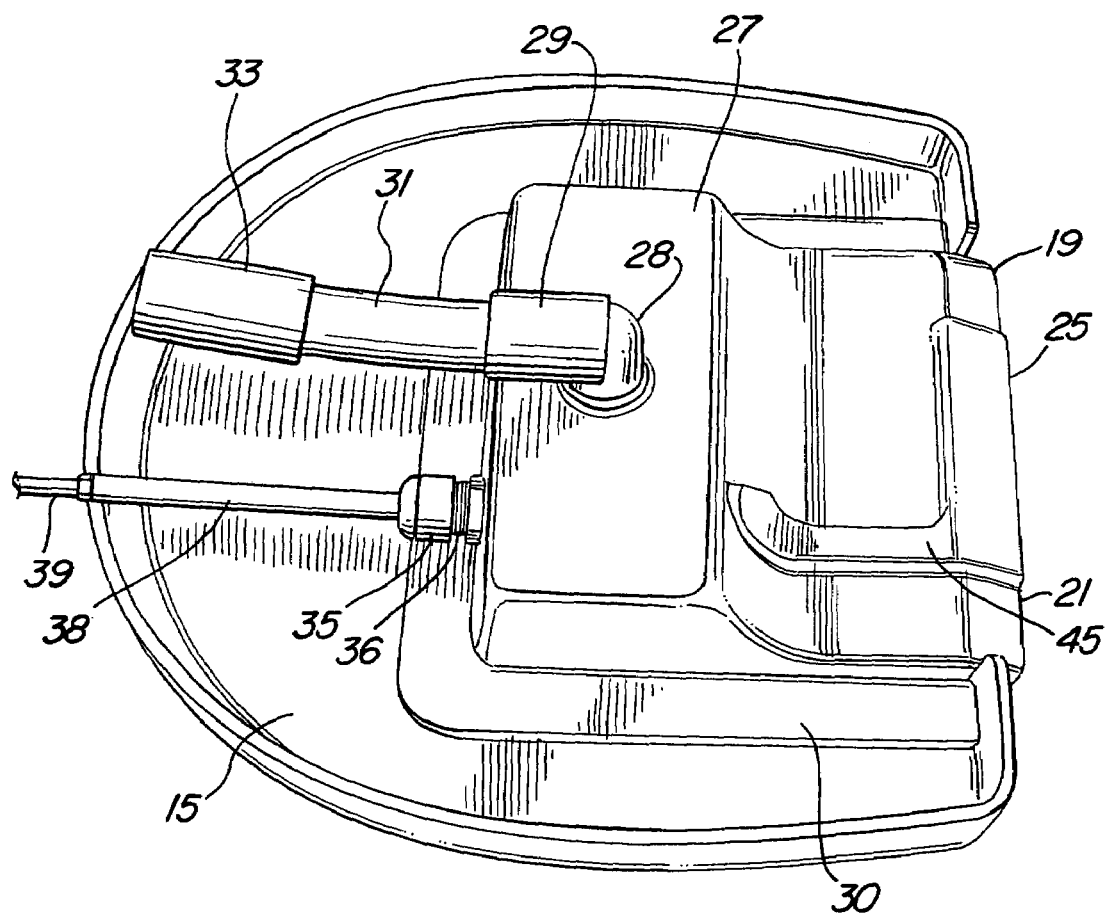
FIG. 4 is a bottom perspective of the waterfall apparatus of the present invention.

FIG. 4 illustrates the bottom side of filter cover 15 which has a plenum chamber 27 attached. Plenum chamber 27 is fed by a waterline 31 at its inlet 28 and allows water inside the plenum chamber to exit at slot 21 by flowing over (lower lip) edge 19 of plenum chamber 27. The inlet 28 to plenum chamber 27 may be connected to waterline 31 by a standard plastic coupling well known in the art. The waterline 31, in turn, is attached to a water flow system of the portable spa (not shown) by another coupling 33. The spas under consideration here have two water flow systems, each driven by a separate pump. One system is the jet pump system. The other is the circulation pump system. The jet pump system is connected to the spa jet nozzles. The circulation pump system is connected to the filtration system for the spa. The waterfall feature of the present invention is preferably connected into the jet pump system.

In addition to receiving water, plenum chamber 27 receives a cable 38, which may be any convenient light-conducting material connected to a threaded coupling 35, 36. Cable 38 and coupling 35, 36 need not be, but may be watertight. Cable 39 extends beyond the perimeter of filter cover 15 and connects to light conducting cable 38.

Figure 5:
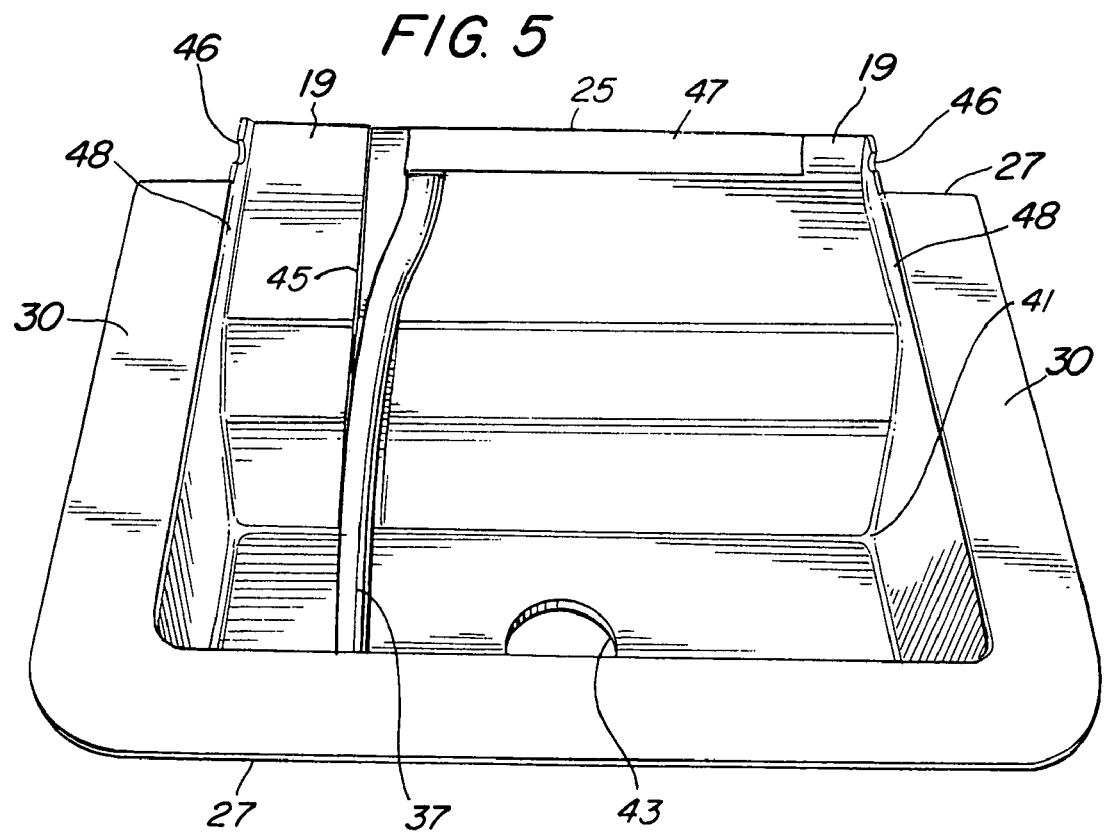
FIG. 5 is a perspective of the inside of the plenum chamber used in the waterfall apparatus of the present invention.

Cable 37, which consists of a bundle of fiber-optic light conducting strands, connects to light connector 53 (FIGS. 6, 7) in the interior 41 of plenum chamber 27 and is laid in a groove 45 located along one wall of plenum chamber 27 (FIG. 5). The end of cable 37 is formed into a lighting shoe 47 that contains a linear array of the light conducting strands that are layered flat and stacked, as desired, to produce a narrow band of light along edge 19.

The lighting shoe 47 forms a smooth platform, along with the remaining length of lower lip 19, over which water from plenum chamber 27 flows to drop into the main body of water 13 in the spa. Looking at the underside of plenum chamber 27 reveals the inlet aperture 43 through which water is fed into the chamber. The plenum chamber is sealed off along flat flanges 30 by the underside of the filter cover 15. The lip 23 (FIG. 3) of filter cover 15, along the exit gap 21, fits into depressions 46 on the outside walls 48 of plenum chamber 27 to define the distance between the upper lip 23 and lower lip 19 of the waterfall exit slot 21.

Figure 6:
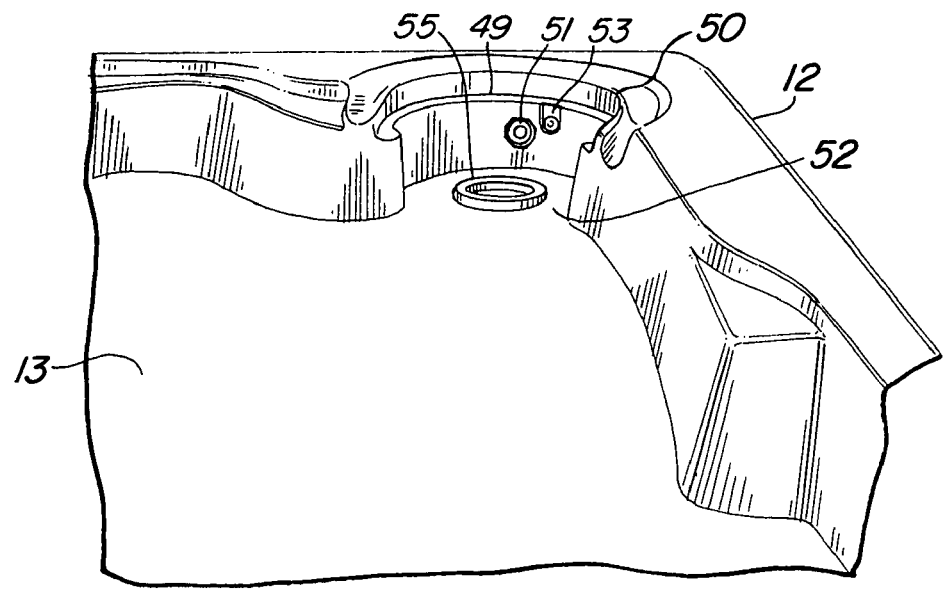
FIG. 6 is a perspective from the inside of a portable spa showing the spa filter housing.

Referring now to FIG. 6 which illustrates the filter housing 50 formed into the side wall of the portable spa by looking through the opening 52, a water connector 51 and a light connector 53 is shown located in the back wall of housing 50. The water 13 in the spa 12 is illustrated as low enough so that the filter recirculating aperture 55 for the spa filter (not shown) is above the waterline. In operation, however, the level of the water 13 in spa 12 will be almost to the ridge 49 within housing 50. Ridge 49 supports the filter cover 15 (FIG. 1) with the plenum chamber 27 attached to its underside. Water connector 51 connects to coupling 33 (FIG. 4) to feed water to the inlet aperture in the plenum chamber 27. Light connector 53 connects to cable 39 and waterproof cable 37 which is connected to the light shoe 47 in plenum chamber 27.

Figure 7:
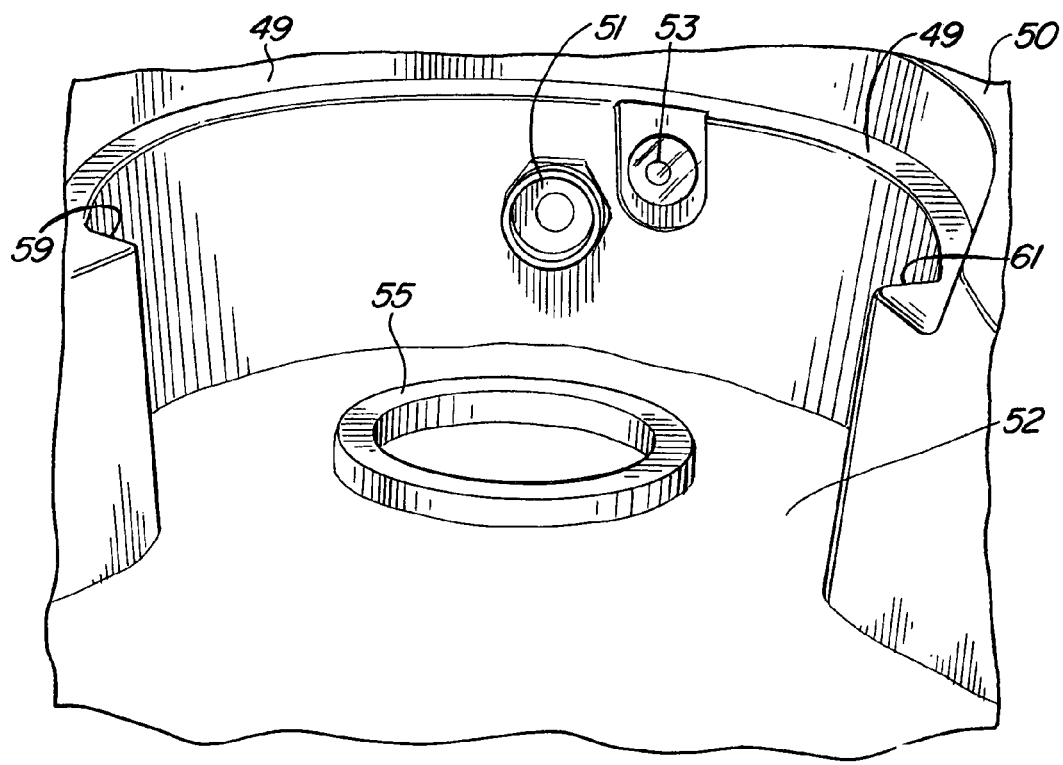
FIG. 7 is a perspective of the spa filter housing of FIG. 6 looking through the opening in the housing.
Figure 8:
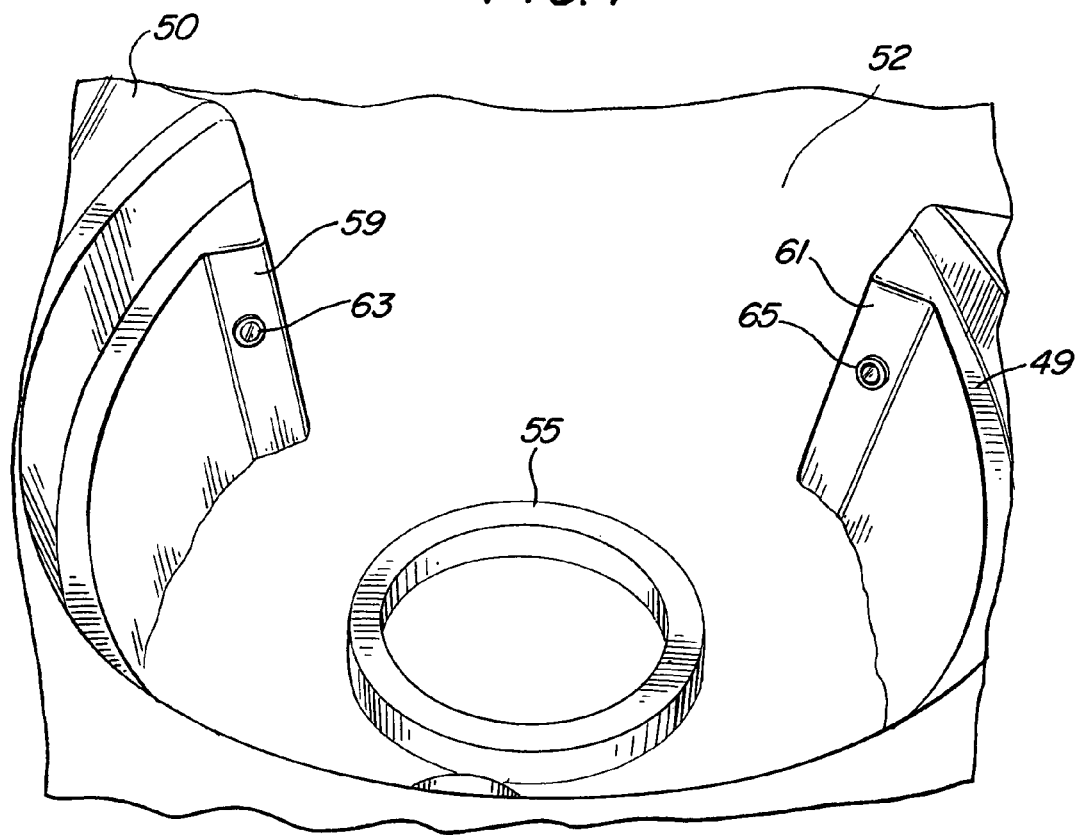
FIG. 8 is a top perspective from behind the filter housing of FIG. 7.

A closer look at these connection points is provided in FIG. 7 which shows the housing 50 within which the filter for the portable spa is located. The spa filter (not shown) is used to continuously filter the main body of water 13 by drawing it through the filter and out the filter flow aperture 55.

Looking at the filter housing 50 from the top at the closed end, towards its opening 52, a pair of light sources 63 and 65 can be seen mounted on walls 59 and 61, respectively, at the edges of opening 52 of filter housing 50. These light sources, which are preferably the ends of fiber-optic cables, or a similar cable, are located in filter housing 50 to light up the water in filter housing 50. The color used may be the same color as the color of light being injected into the waterfall 17 as it exits the plenum chamber 27, thereby providing a colored backdrop for the waterfall.

Figure 9:
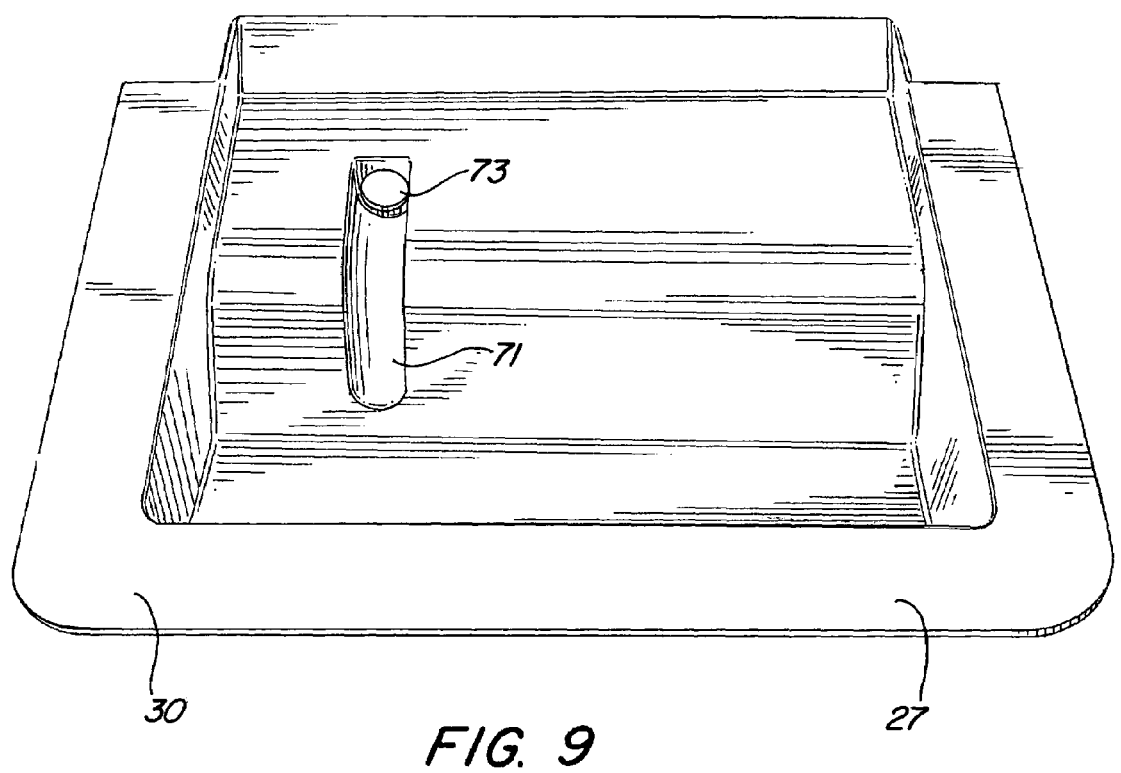
FIG. 9 is a top perspective of an alternate embodiment of the plenum chamber according to the present invention.
Figure 10:
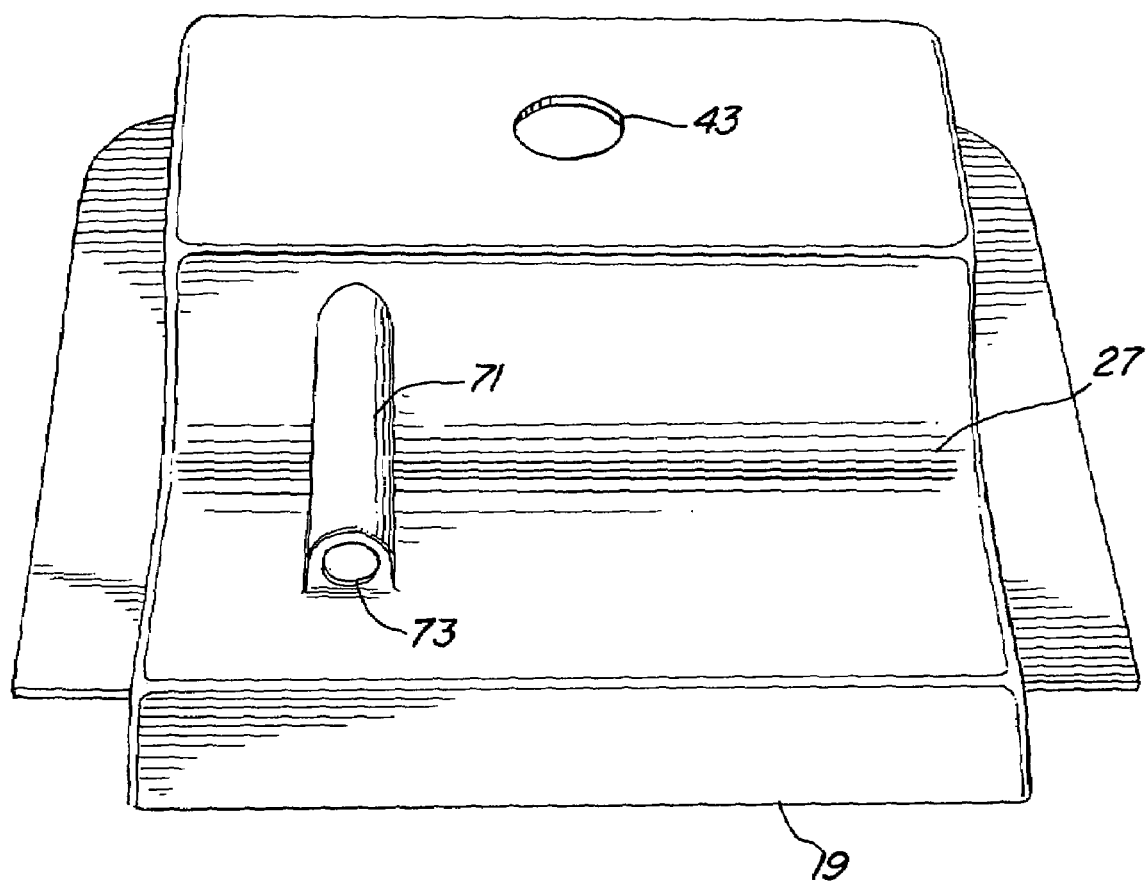
FIG. 10 is a bottom perspective of the plenum chamber of FIG. 8.

An alternate preferred construction for the plenum chamber 27 of the present invention is illustrated in FIGS. 9 through 15. FIG. 9 shows the plenum chamber 27 which is fastened to the bottom of filter cover 15 by flanges 30 having a trench 71 with an aperture 73 in its end wall directed to lower lip 19. FIG. 10 shows the bottom of plenum chamber 27, and specifically the location of inlet aperture 43 in the underside of plenum chamber 27 in relation to the trench 71 with its exit aperture 73.

Figure 11:
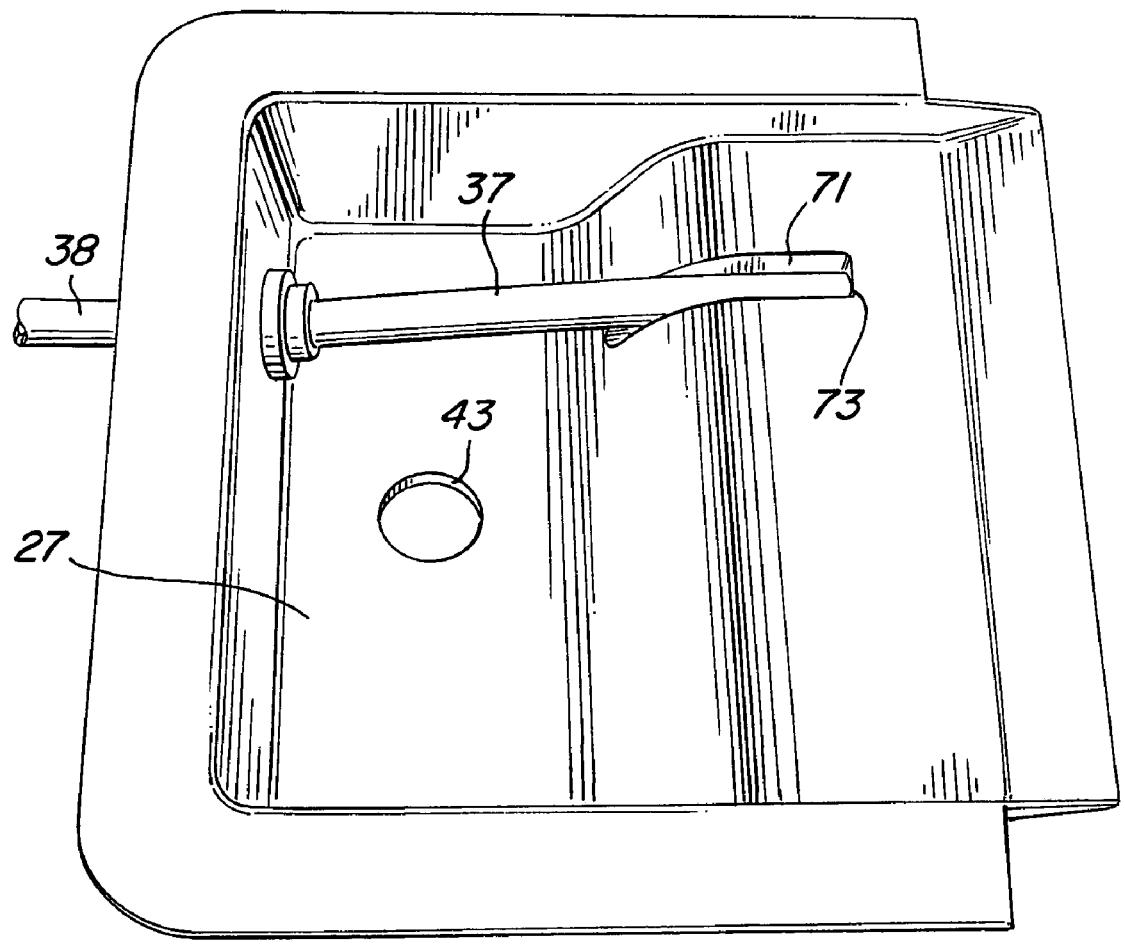
FIG. 11 is a top perspective of the plenum chamber of FIG. 9 with light cabling.
Figure 12:
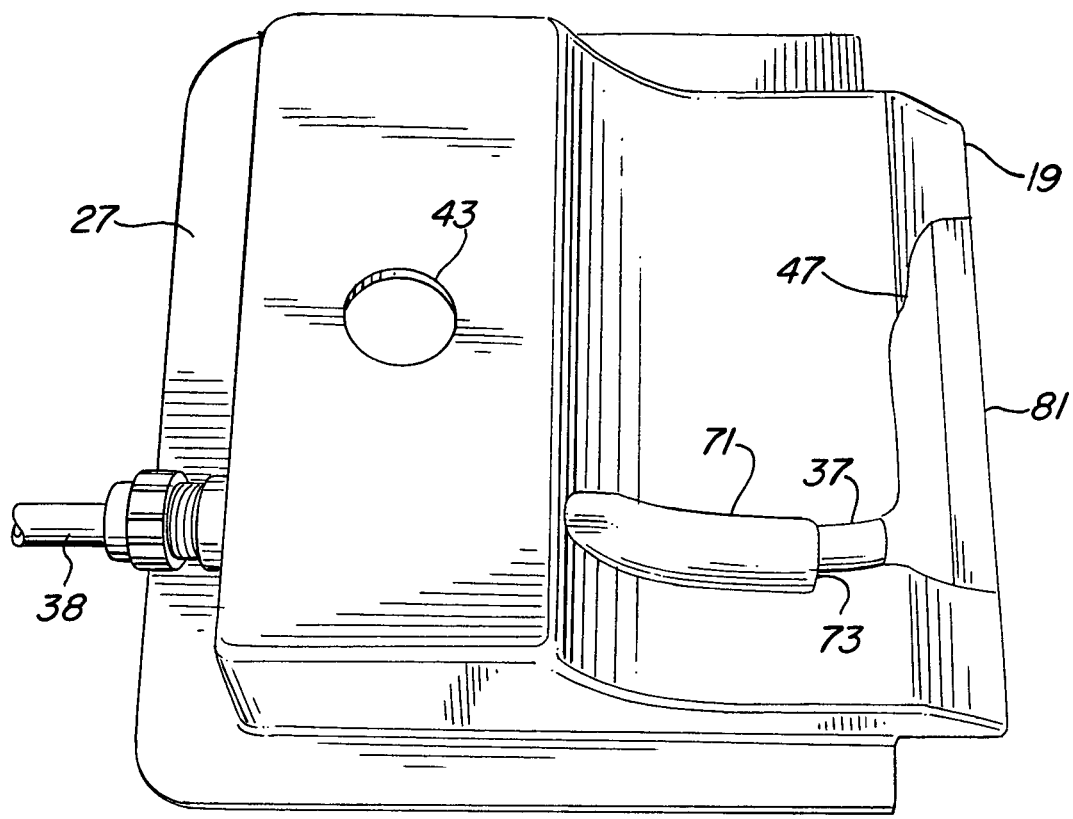
FIG. 12 is a bottom perspective of the plenum chamber of FIG. 11 with a light array.

FIG. 11 shows the placement of the fiber-optic cable bundle 37 within trench 71 of plenum chamber 27. FIG. 12 illustrates the underside of plenum chamber 27 with cable 37 located in trench 71 of plenum chamber 27 and coming out the exit aperture 73. The end of cable 37 is an array or shoe of fiber-optic strands 47 that are formed into a linear array of stacked fiber-optic ends 81 which eject a narrow band of light along the underside of lip 19 of plenum chamber 27.

Figure 13:
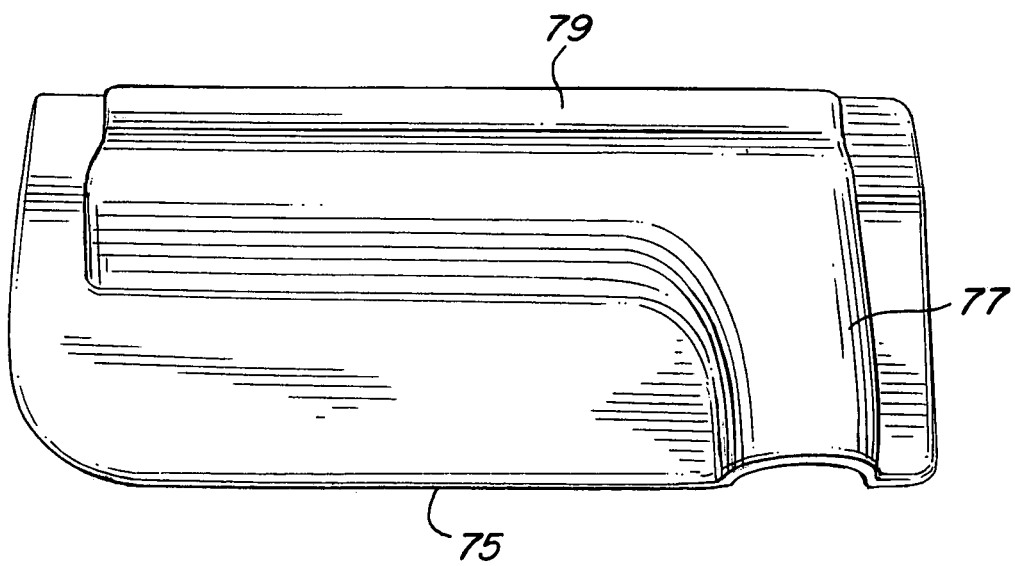
FIG. 13 is a bottom perspective of a light shoe cover for the light array of FIG. 12.
Figure 14:
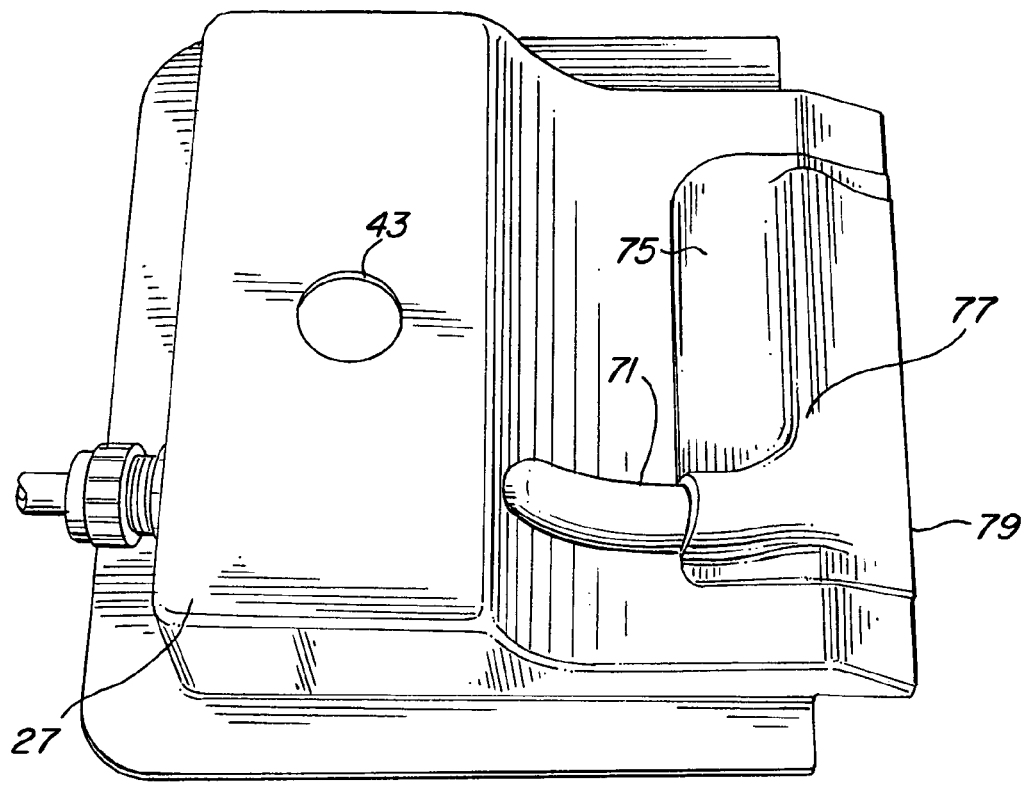
FIG. 14 is a bottom perspective of the plenum chamber of FIG. 11 with the light shoe cover in place over the light array.

FIG. 13 illustrates the cover 75 for the light shoe 47 shown in FIG. 12. The cover 75 is glued to the underside of plenum chamber 27 over cable 37 and light shoe 47. A recess 77 has been formed in cover 75 to receive the cable 37 and light shoe 47. An additional recess 79, which is thin and long, is formed at the exit edge of the light shoe 75. FIG. 14 illustrates the light shoe 75 in place on the bottom of plenum chamber 27 over the cable 37 and light shoe 47 with the exit recess 79 aligned with the lip 19 of plenum chamber 27.

Figure 15:
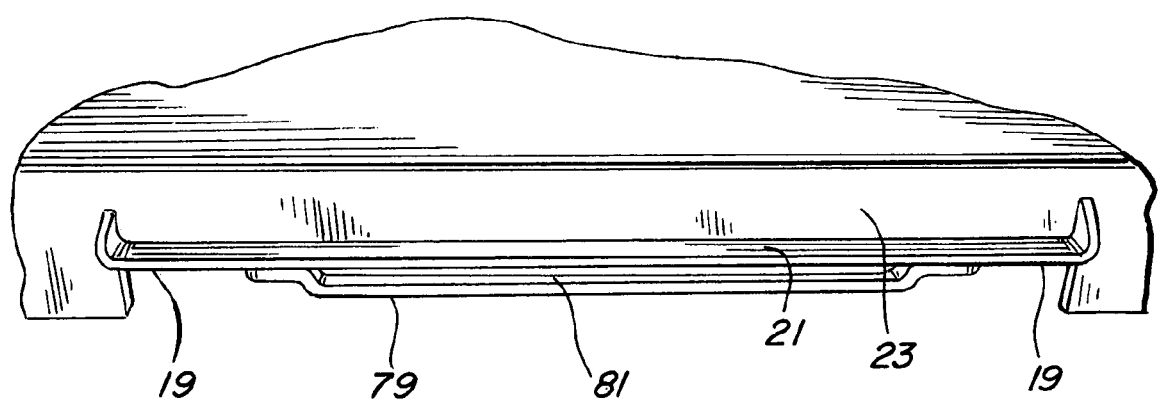
FIG. 15 is a front perspective of the plenum chamber showing the exit gap for water flow and placement of the light array.

The combination, as can be seen in FIG. 15, produces an exit gap 21 just as in the embodiment described above, formed by the upper lip 23 of the filter cover and the lower lip 19 of the plenum chamber. The difference between the two embodiments is that the ends 81 of the fiber-optic strands that eject light into the water coming from the exit gap 21 are located below the lower lip 19, rather than above the lower lip 19 as in the previous embodiment.

What is claimed is:

1. A waterfall apparatus for a portable spa having a filter housing and cover, the waterfall apparatus comprising:
    a plenum chamber attached to the underside of the cover for the filter housing of the portable spa, the plenum chamber having a water inlet and a water outlet, the water inlet being supplied water to fill the plenum chamber, and the water outlet shaped to provide a waterfall at an edge of the cover into the spa, the plenum chamber having a light connector inlet; and
    a fiber optic cable having a fiber optic array at one end connected to the light connector inlet of the plenum chamber by the other end, the fiber optic array being located at the water outlet of the plenum chamber, the fiber optic cable located in the plenum chamber.

2. The waterfall apparatus of claim 1 wherein
    the water supplied to the inlet of the plenum chamber is fed by a waterline connected to the jet pump system of the portable spa.

3. The waterfall apparatus of claim 1 wherein the water outlet of the plenum chamber is an elongated slot along the side of the cover facing the water in the portable spa to provide a ribbon-shaped waterfall into the water.

4. The waterfall apparatus of claim 3 wherein the fiber-optic array is located along the elongated slot.

5. The waterfall apparatus of claim 4 wherein the water supplied to the inlet of the plenum chamber is fed by a waterline connected to the jet pump system of the portable spa.

6. The waterfall apparatus of claim 5 wherein the plenum chamber and filter housing cover are made of molded plastic.

7. The waterfall apparatus of claim 1 further comprising:
    a light connector outlet in the plenum chamber near the water outlet of the plenum chamber.

8. The waterfall apparatus of claim 7 wherein the fiber-optic array is located at the water outlet outside the plenum chamber.

9. The waterfall apparatus of claim 1:
    wherein the fiber optic array is located inside the plenum chamber so that water flows over the fiber optic array.

\* \* \* \* \*